United States Patent
Brown et al.

(10) Patent No.: US 11,821,688 B2
(45) Date of Patent: Nov. 21, 2023

(54) DEHYDRATOR FOR BIOLOGICAL MATERIAL

(71) Applicant: TRIPLE GREEN PRODUCTS INC., Morris (CA)

(72) Inventors: Calvin Brown, Winkler (CA); Lyall Wiebe, East St. Paul (CA)

(73) Assignee: Triple Green Products Inc., Morris (CA)

( * ) Notice: Subject to any disclaimer, the term of this patent is extended or adjusted under 35 U.S.C. 154(b) by 296 days.

(21) Appl. No.: 17/378,947

(22) Filed: Jul. 19, 2021

(65) Prior Publication Data
US 2022/0082326 A1 Mar. 17, 2022

Related U.S. Application Data

(60) Provisional application No. 63/079,626, filed on Sep. 17, 2020.

(51) Int. Cl.
*F26B 9/08* (2006.01)
*F26B 1/00* (2006.01)
(Continued)

(52) U.S. Cl.
CPC ............... *F26B 9/082* (2013.01); *B09B 3/40* (2022.01); *C02F 11/13* (2019.01); *F26B 1/005* (2013.01);
(Continued)

(58) Field of Classification Search
CPC .. F26B 9/082; F26B 1/005; F26B 3/04; F26B 21/12; F26B 23/028; F26B 2200/18; F26B 17/18; F26B 2200/02; F26B 2200/04; F26B 3/06; F26B 11/16; B09B 3/40; C02F 11/13; C02F 2103/22; Y02W 30/40; B09C 1/06
See application file for complete search history.

(56) References Cited

U.S. PATENT DOCUMENTS

2014/0190792 A1* 7/2014 Moriyama ............. B65G 33/18
198/663

FOREIGN PATENT DOCUMENTS

EP 1547984 A1 * 6/2005 ............ B01F 15/065
KR 20160144536 A * 12/2016

OTHER PUBLICATIONS

Translation, KR-20160144536-A, Choi et al., Dec. 2016 (Year: 2016).*

* cited by examiner

*Primary Examiner* — Jessica Yuen
(74) *Attorney, Agent, or Firm* — Kyle R Satterthwaite; Ryan W Dupuis; Ade & Company Inc.

(57) ABSTRACT

A dehydrator apparatus for dehydrating biological material. The apparatus includes an external housing, and a vessel supported within said external housing and spanning in a longitudinal direction thereof in elevated relation from a bottom of the housing. A loading inlet feeds into said vessel from outside the housing for admission of biological material. An air intake feeds into the housing to deliver heated air thereto from a hot air source, and air routing components within the external housing guide the heated air into heat exchange relationship with the vessel itself, and also into heating and aerating exposure to contents of said vessel. An agitator is installed in operable relation to the vessel to agitate the material fed thereinto via the material inlet. An exhaust outlet exhausts the heated air from the housing after having heated and aerated the vessel and its contents.

34 Claims, 6 Drawing Sheets

(51) Int. Cl.
*F26B 3/04* (2006.01)
*F26B 23/02* (2006.01)
*C02F 11/13* (2019.01)
*F26B 21/12* (2006.01)
*B09B 3/40* (2022.01)

(52) U.S. Cl.
CPC ................ *F26B 3/04* (2013.01); *F26B 21/12* (2013.01); *F26B 23/028* (2013.01); *F26B 2200/18* (2013.01)

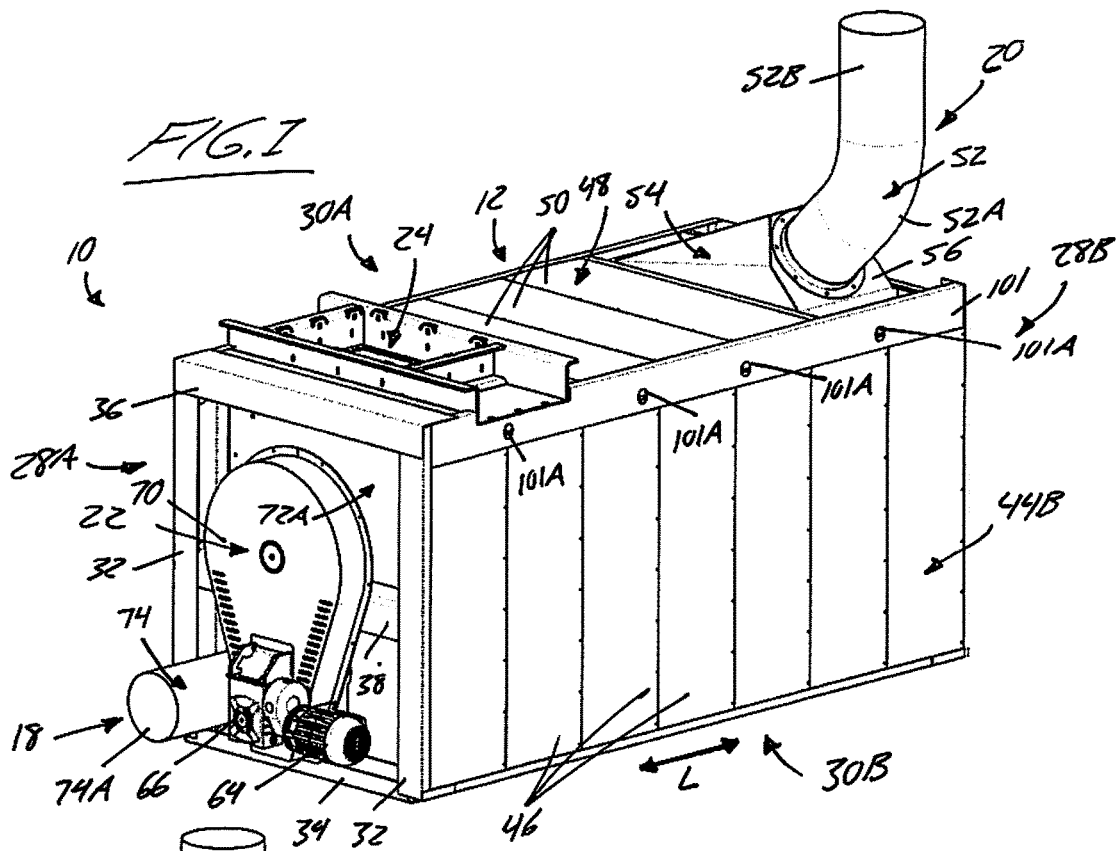
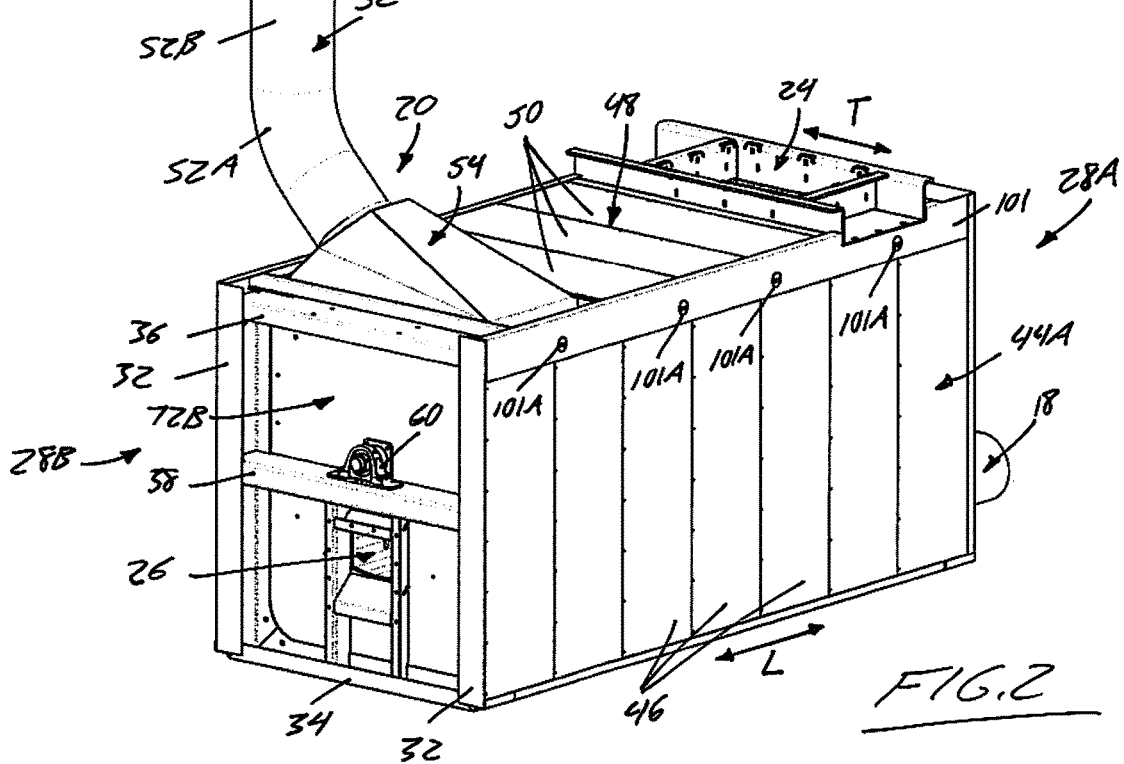

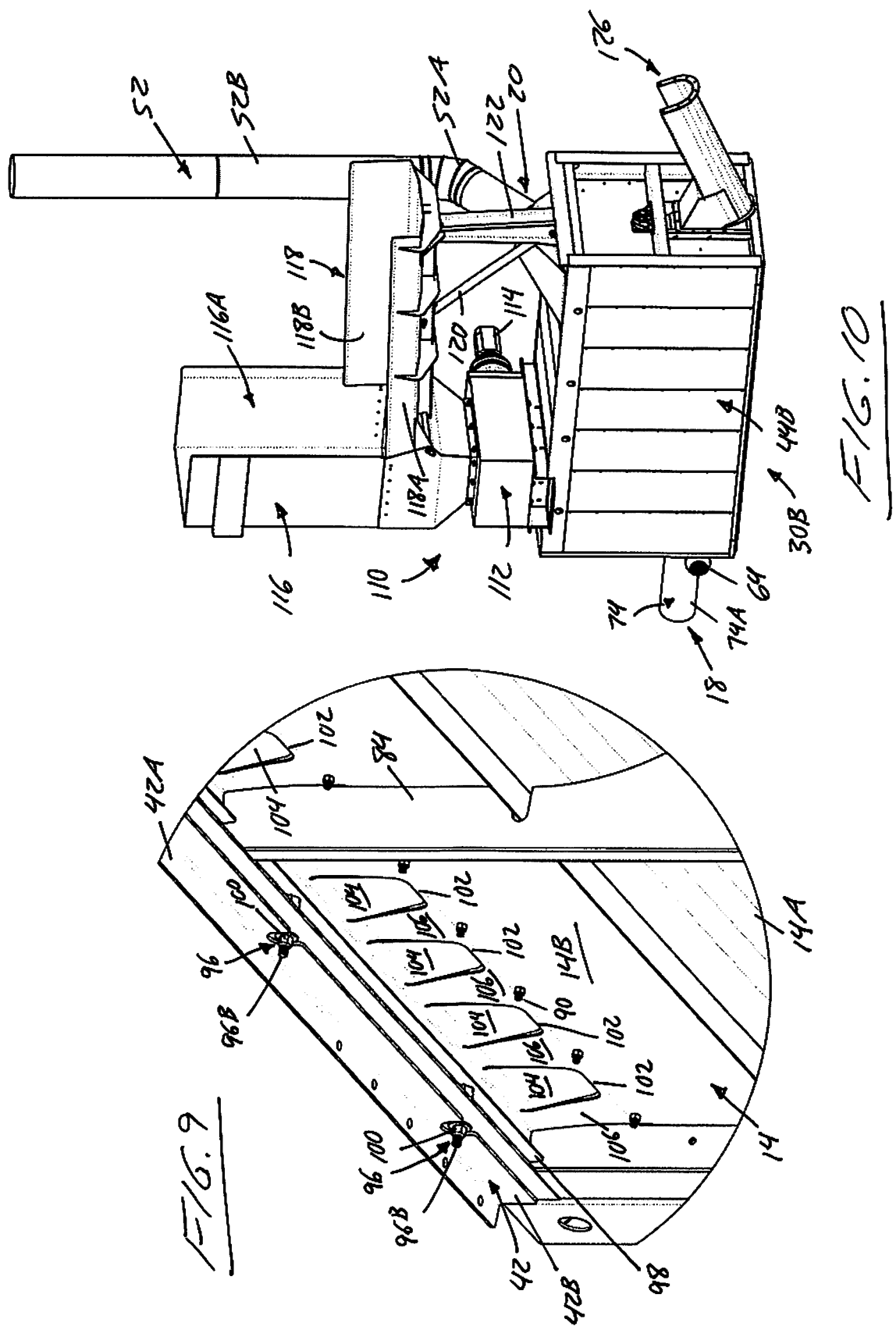

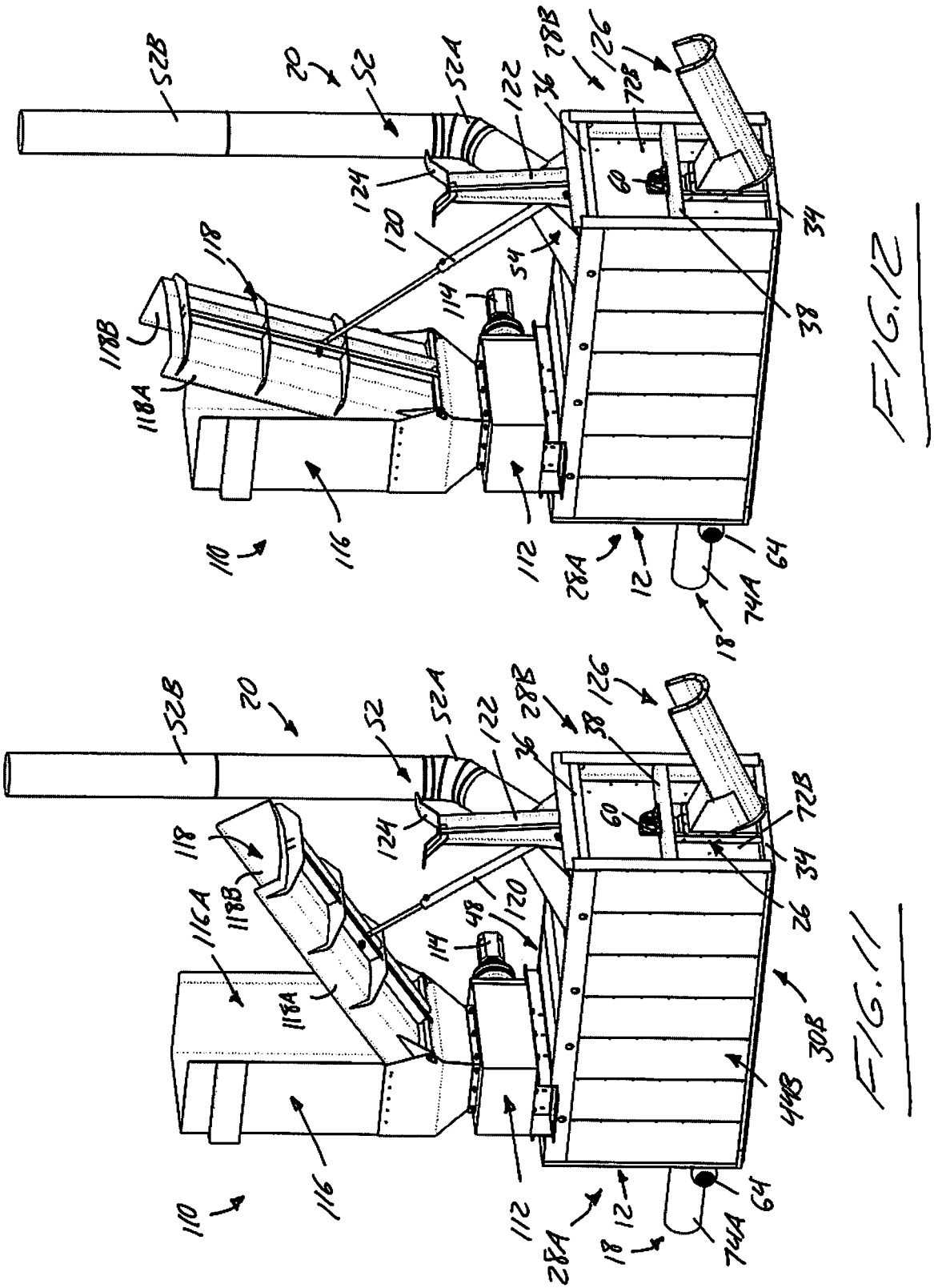

DEHYDRATOR FOR BIOLOGICAL MATERIAL

CROSS-REFERENCE TO RELATED APPLICATIONS

This application claims benefit under 35 U.S.C. 119(e) of U.S. Provisional Patent Application No. 63/079,626, filed Sep. 17, 2020, the entirety of which is incorporated herein by reference.

FIELD OF THE INVENTION

The present invention relates generally to disposal of biological waste, for example including wastewater sludge and livestock mortalities.

BACKGROUND

Safe and efficient disposal of biological waste remains a challenge in many industries, such as in agriculture, where cost efficient and environmentally sound approaches to livestock mortality management are needed, and in wastewater treatment, where similar needs exist for disposal of sewage sludge.

Prior solutions have included composting of such livestock mortalities and sewage sludge into soil additives, for example as evidenced by Applicant's own Biorotor Composter for livestock mortalities, manure and plant waste. However, the composting process is relatively time consuming, and leaves room for improved and alternative solutions to the biological waste disposal problem.

In response to such need, Applicant has developed a novel dehydrator for biological waste materials.

SUMMARY OF THE INVENTION

According to one aspect of the invention, there is provided a dehydrator apparatus for dehydrating biological material, said apparatus comprising:

an external housing;

a vessel supported within said external housing and spanning in a longitudinal direction thereof in a position placing a bottom of said vessel in elevated relation from a bottom of said housing;

a loading inlet feeding into said vessel from outside the external housing for admission of biological material to be dehydrated or composted within the apparatus;

an air intake feeding into the external housing to deliver heated air thereto from a hot air source;

air routing components residing within the external housing and configured to guide said heated air into heat exchange relationship with said vessel, and into heating and aerating exposure to contents of said vessel;

an agitator installed in operable relation to the vessel to agitate the material fed thereinto via the material inlet; and an exhaust outlet for exhausting said heated air from the external housing after having heated and aerated said vessel and said contents.

BRIEF DESCRIPTION OF THE DRAWINGS

Preferred embodiments of the invention will now be described in conjunction with the accompanying drawings in which:

FIG. 1 is a top perspective view of a biological material dehydrator according to one embodiment of the present invention from a first end and side thereof.

FIG. 2 is a top perspective view of the biological material dehydrator of FIG. 1 from an opposing second end and side thereof.

FIG. 9 is a partial perspective side view of the biological material dehydrator of FIG. 1 with insulated walls panels and corner flashing thereof removed to illustrate a series of airflow control dampers in a sidewall of an internal trough of the apparatus.

FIG. 10 is a side perspective view of the biological material dehydrator of FIG. 1 from the second end thereof, illustrating optional installation of a loading tray, grinder and discharge conveyor thereon.

FIG. 11 is another side perspective view of the biological material dehydrator of FIG. 10, with the loading tray partially raised out of its default receiving position shown in FIG. 10.

FIG. 12 is another side perspective view of the biological material dehydrator of FIG. 10, with the loading tray fully raised into a dumping position.

DETAILED DESCRIPTION

Figure 3:
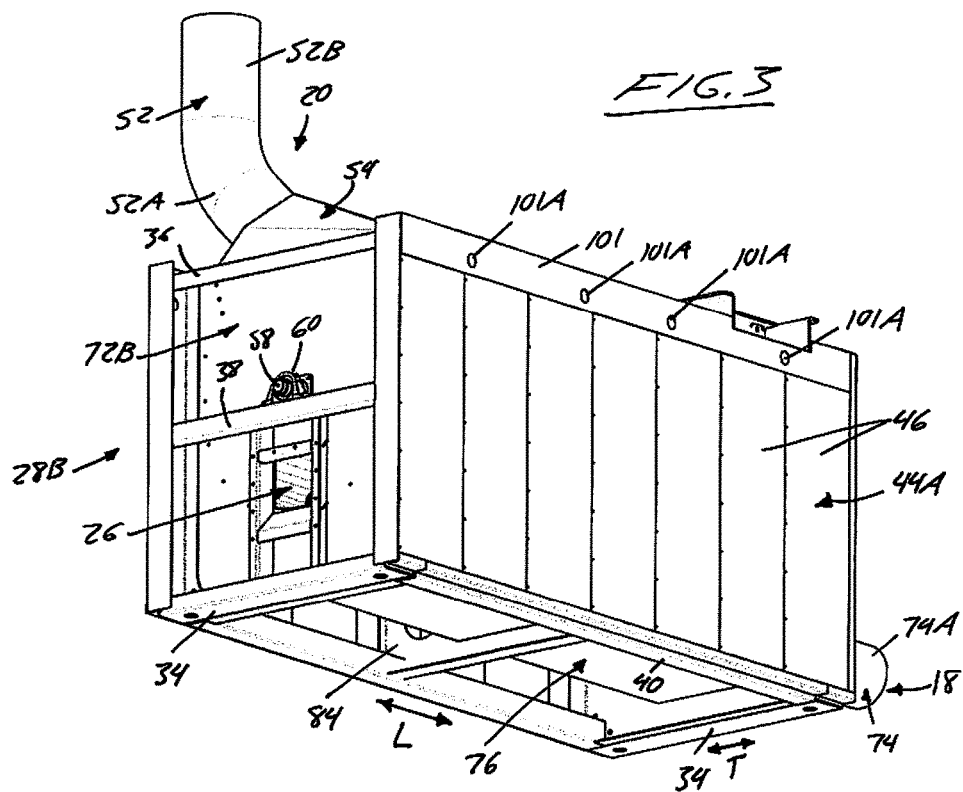
FIG. 3 is a bottom perspective view of the biological material dehydrator of FIG. 1 from the second end and side thereof.
Figure 4:
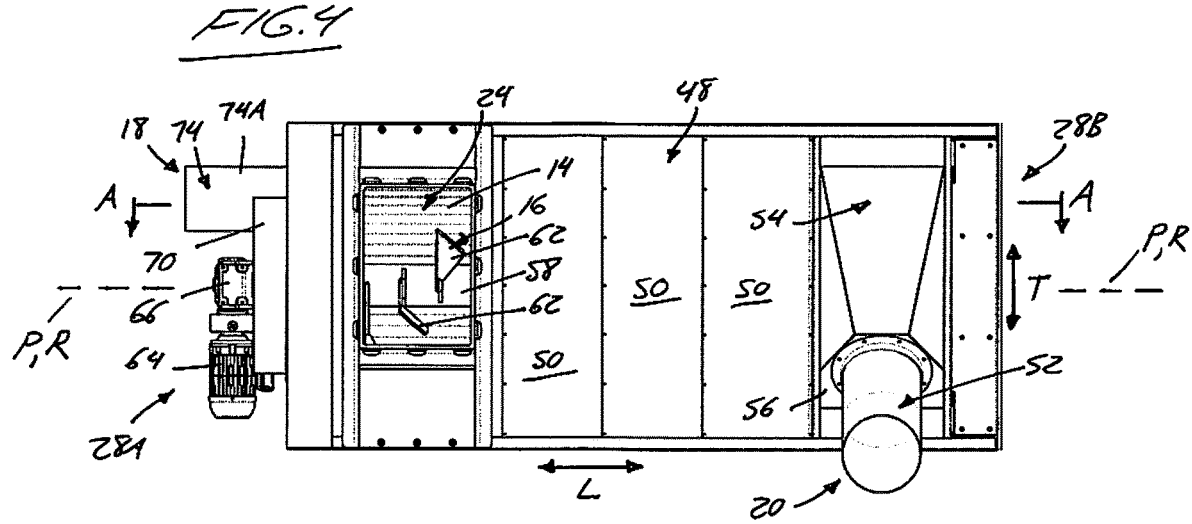
FIG. 4 is a top plan view of the biological material dehydrator of FIG. 1.

The biological material dehydrator 10 of the illustrated embodiment is generally composed of an enclosed external housing 12, an internal vessel 14 disposed within the housing 12, an agitator 16 disposed within the vessel 14, a hot air intake 18 for feeding a stream of heated air into the housing 12, an exhaust outlet 20 for exhausting the introduced air from the housing after heating the interior space of the housing and its contents, a drive system 22 for driven operation of the agitator, a loading inlet 24 opening into the housing for introduction of biological material into the vessel, and an unloading outlet 26 for discharging of material from the vessel to an exterior of the housing.

The external housing 12 has first and second ends 28A, 28B spaced horizontally apart in a longitudinal direction L, and first and second sides 30A, 30B spaced horizontally apart in a transverse direction T that is perpendicular to the longitudinal direction L. A skeletal framework of the housing includes a skeletal subframe at each end 28A, 28B that is composed of two upright frame members 32 horizontally spaced apart in the transverse direction and defining respective corners of the housing, a lower cross member 34 horizontally interconnecting the upright frame members 32 at bottom ends thereof, an upper cross member 36 horizontally interconnecting the upright frame members 32 at top ends thereof, and an intermediate cross member 38 horizontally interconnecting the upright frame members 32 at intermediate elevation thereon between the upper and lower cross members. The skeletal framework further includes longitudinal frame members that interconnect the subframes at the two ends of the housing, including a pair of transversely spaced apart lower longitudinal frame members 40 running horizontally corner to corner of the housing at respective sides thereof in generally coplanar relation to the lower cross members 34 of the subframes to delimit therewith a rectangular base of the housing, and a pair of transversely spaced apart upper longitudinal frame members 42 running horizontally corner to corner of the housing at respective sides thereof in generally coplanar relation to the upper cross members 34 of the subframes to delimit a rectangular roof area of the housing.

Each side of the housing 30A, 30B is enclosed by a respective sidewall 44A, 44B of the housing, which in the illustrated example is constructed in modular fashion by a series of insulated wall panels 46 whose upper and lower ends are fastened in place to the upper and lower longitudinal frame members 42, 44. A roof 48 closing off the top of the housing likewise features a series of insulated roof panels 50 laid out horizontally between the upper longitudinal frame members 42 and fastened thereto at opposing ends of each roof panel 50. However, instead of forming a full-span roof spanning entirely from one end of the housing to the other like the insulated wall panels of the housing, the insulated roof panels 50 constitute only a closed central region of the roof that resides centrally between the loading inlet 24 and the exhaust outlet 20, both of which also resides at the top of the housing in the illustrated embodiment.

In the illustrated example, the exhaust outlet 20 comprises a chimney or flue-like exhaust duct 52 installed in an offset manner from a longitudinal midplane P of the housing, for reasons explained herein further below. To facilitate the offset position of the exhaust duct 52, the roof has a pitched plenum section 54 situated adjacent a respective end 28B of the housing. The pitched plenum section 54 slopes upwardly from one side 30A of the housing and past the longitudinal midplane P thereof toward the opposing side 30B housing, before then angling back down to meet with the upper longitudinal rail 42 at this side 30B of the housing. This downwardly angled part 56 of the plenum section 54 adjacent to side 30B of the housing forms the outlet of the plenum section 54 to which a bottom end of the exhaust duct 52 is coupled. The exhaust duct 52 initially slopes outwardly and upwardly from the outlet of the plenum section, and in the illustrated example then has an elbowed section 52A that transitions into a vertically upright remainder of the duct 52B.

Figure 6:
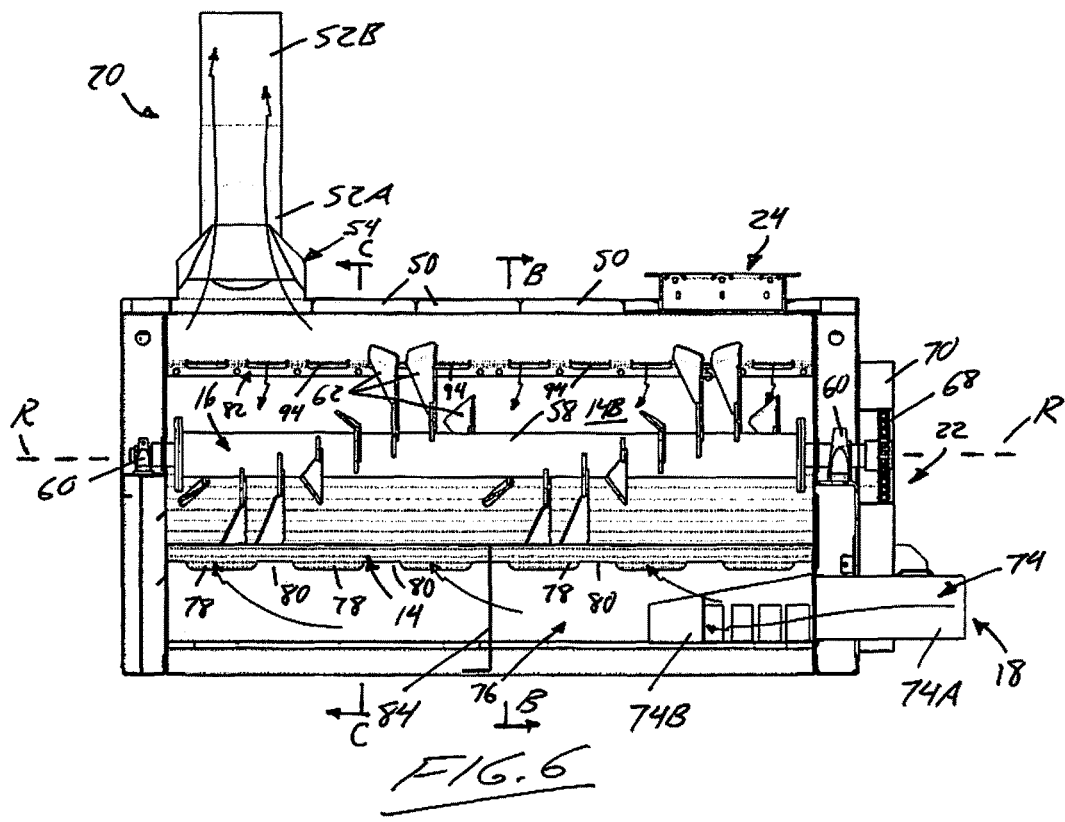
FIG. 6 shows a longitudinal cross-section of the biological material dehydrator of FIG. 4, as viewed along line A-A thereof.
Figure 7:
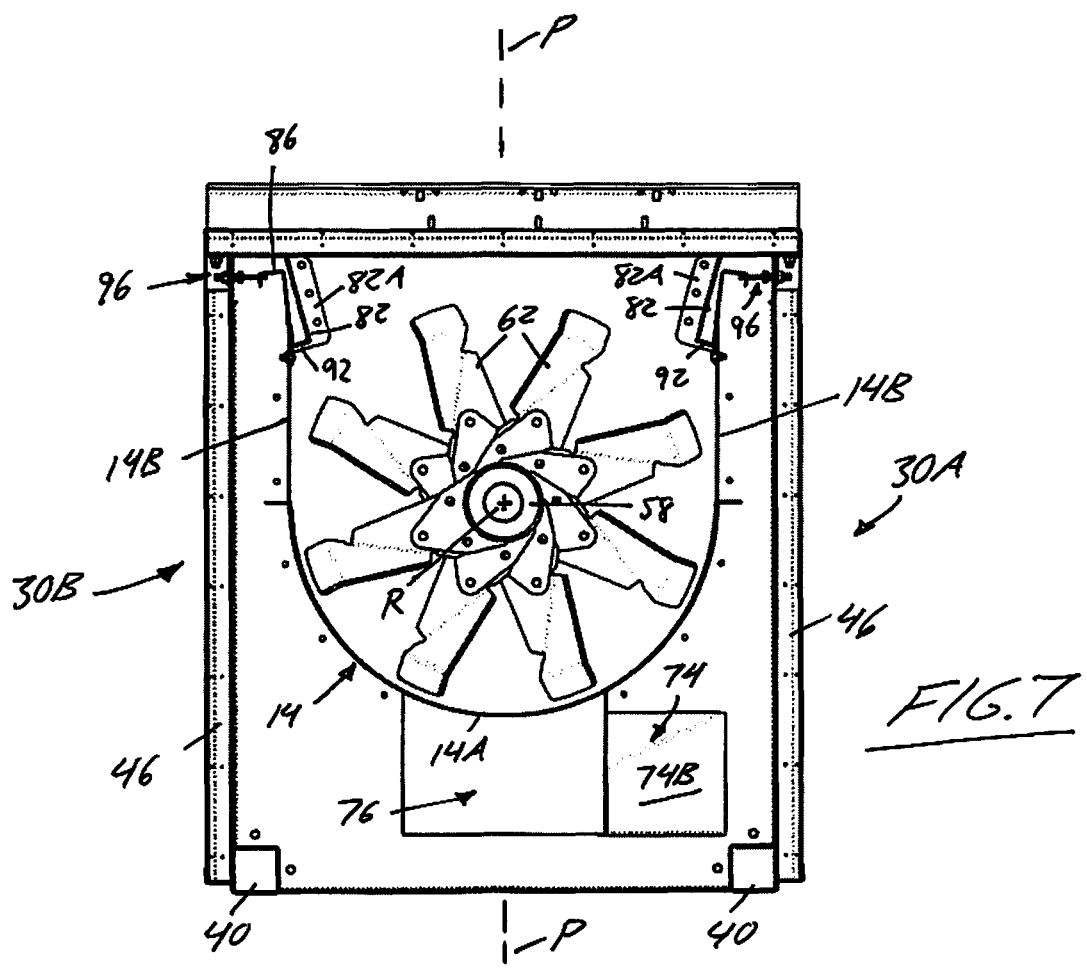
FIG. 7 shows a transverse cross-section of the biological material dehydrator of FIG. 6, as viewed along line B-B thereof.

As best shown in the transverse cross-section of FIG. 7, the vessel 14 of the illustrated embodiment is an elongated open-top vessel in the form of U-shaped trough having a curved semi-cylindrical bottom wall 14A whose topside defines a concave floor of the trough, and two vertically upright side walls 14B standing upright at opposite ends of the bottom's wall semi-circular cross-section. As shown in the longitudinal cross-section of FIG. 6, the trough spans a full length of the housing's interior space in the longitudinal direction L. The agitator 16 comprises a longitudinal shaft 58 rotatably supported at its longitudinally opposing ends by bearings 60 mounted on the intermediate cross-members 38 of the skeletal subframes at the two ends 28A, 28B of the housing. The central rotational axis R of the longitudinal shaft 58 is the same axis defining the radial center of the semi-cylindrical bottom wall 14A of the trough 14, whereby the agitator resides concentrically inside the trough 14. The agitator has a plurality of tines 62 coupled to the shaft 58 in positions radiating outward therefrom, and laid out on a helically spiraled pattern over the surface area of the shaft 58. The tines are therefore operable to both agitate biological materials received in the trough, and displace such materials axially along the trough in the longitudinal direction L. The shaft is rotatable in both directions about is central rotational axis R, thereby enabling displacement of the biological materials in both directions along the trough 14, i.e. forwardly therealong toward the second end 28B of the housing 12 and rearwardly therealong toward the first end 28A of the housing 12.

The drive system 22 installed at the first end 28A of the housing for driven rotation of the agitator 16 features a motor 64 operably coupled to a gearbox 66 in driving relation thereto. An output gear of the gearbox 66 drives a chain 68 that is entrained around both said output gear of the gearbox and a corresponding drive gear mounted on a respective end of the agitator's longitudinal shaft 58, as can be seen in FIG. 6. For safety, these gears and the chain entrained thereabout are contained in a drive housing 70 that is mounted to the lower and intermediate cross-members 34, 38 of the subframe at this end of the housing. The motor 64 and gearbox 66 may in turn be supported by the drive housing 70, or may be independently or additionally mounted to the lower cross-member 34 of the subframe. In the illustrated embodiment, the drive system 22 resides at the same end of the housing as the air intake 18, and the gearbox 66 and drive housing 70 of the drive system reside at the longitudinal midplane P of the housing that also contains the central rotational axis R of the agitator's longitudinal shaft 58. Therefore, the air intake 18 of the illustrated embodiment is situated in an offset position spaced to one side of the housing's longitudinal midplane P at a transversely spaced location between the midplane P and a respective side 30A of the housing. In the illustrated example, the drive housing 70 has a tapered teardrop-like shape that's wider at its upper half, which contains the larger drive gear of the agitator's longitudinal shaft, compared to a narrower lower half in which the smaller output gear of the gearbox 66 is contained. The narrower lower half of the drive housing accommodates the offset placement of the air intake 18 between the drive housing 70 and the respective side 30A of the housing.

The subframe at each end of the housing 12 is internally lined with an insulated end wall 72A, 72B of the housing, and these insulated end walls cooperate with the insulated roof 48 and the insulated side walls 44A, 44B, and with whatever floor or ground surface the base of the housing is placed upon, in order to fully enclose the interior space of the housing in which the trough 14 is contained. The only ingress and egress points from this otherwise fully enclosed interior space of the housing are therefore the air intake 18, the exhaust outlet 20, the loading inlet 24 and the unloading outlet 26. In air intake 18 comprises an intake duct 74 penetrating the end wall 72A of the housing at the first end 28A thereof that is also occupied by the drive system 22, and that is neighboured by the roof-situated loading inlet 24. The loading inlet penetrates through the roof of the housing to allow gravitational dumping of biological material into the trough 14, whose open top end underlies the loading inlet. The unloading outlet 26 penetrates the end wall 72B of the housing at the opposing second end 28B thereof. The first and second ends 28A, 28B of the housing 12 are thus also referred to herein as the loading and unloading ends of the housing, since these are the respective ends at or adjacent which biological material is loaded into the trough, and subsequently unloaded therefrom after being dehydrated therein.

Figure 5:
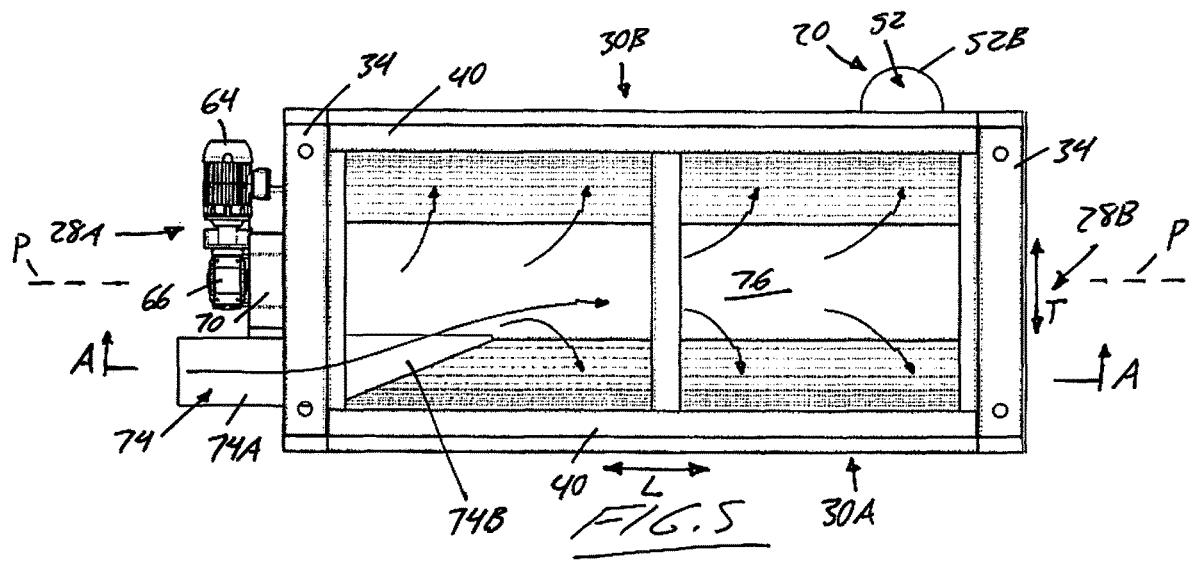
FIG. 5 is a bottom plan view of the biological material dehydrator of FIG. 1.

The dehydration of the biological material loaded into the trough is achieved using heated air supplied through the air intake 18 from an outside heated air source, which is preferably, but not limited to, a biomass furnace, which may for example be the biomass furnace disclosed in Applicant's U.S. Provisional Patent Application No. 63/056,170, filed Jul. 24, 2020, the entirety of which is incorporated herein by reference. An exterior section 74A of the intake duct 74 residing outside the housing is thus connected to the hot air output of the biomass furnace to receive a stream of heated air therefrom, preferably a forced air stream encouraged into the housing 12 via one or more fans installed in the intake duct, and/or or somewhere upstream thereof, whether as part of the dehydrator or furnace, or as an inline component installed somewhere between the furnace and the dehydrator. As best seen in FIG. 5, an interior section 74B of the air intake duct 74 angles inwardly toward the longitudinal midplane P of the housing and feeds into an air distribution channel 76 that runs longitudinally of the housing interior over the full length thereof at a position directly underlying the bottom wall 14A of the trough 14. The bottom wall 14A of the trough thus also denotes the top wall of this air distribution channel. The midplane P of the housing bisects the U-shaped trough 14 and the underlying the air distribution channel 76. The interior of this air distribution channel 76 is denotes an enclosed under-vessel airspace that is elevationally situated between the underside of the trough and the base of the housing, and runs longitudinally of the housing from one end of the trough to the other. A fraction of the heated air directed into the air distribution channel 76 through the intake duct 72 thus flows along the bottom wall of the trough 14, thereby warming an interior of the trough through the floor thereof.

Each sidewall of the air distribution channel 76 ("channel wall", for brevity) has a series of outlet holes 78 therein at longitudinally spaced positions therealong, preferably at or adjacent a top end of the channel wall that joins up to the trough's curved bottom wall 14A. In the illustrated embodiment, the outlet holes 78 are elongated slot-shaped cutouts in the top edge of the channel wall, between which intact portions 80 of the channel wall connect to the bottom wall of the trough, as best seen in FIG. 6. The outlet holes 78 of the air distribution channel are distributed along the full length thereof, whereby at each of these outlet-equipped locations along the air distribution channel, heated air is diverged laterally outward from the distribution channel into lateral airspaces of the housing that are situated between the trough 14 and the sidewalls 44A, 44B of the housing. This laterally diverged flow of heated ar flows upwardly along the outside of the trough's sidewalls 14B, thus causing a warming thereof to further contribute to heating of the trough interior through the sidewalls thereof. The air distribution channel 76 is closed at its ends and fully covered by the trough, whereby the only point of egress from the air distribution channel 76 is these outlet openings 78, whereby all air fed into the air distribution channel 76 departs therefrom through these openings 78 and into the lateral airspaces between the sidewalls 14B of the trough and the sidewalls 44A, 44B of the housing 12.

Figure 8:
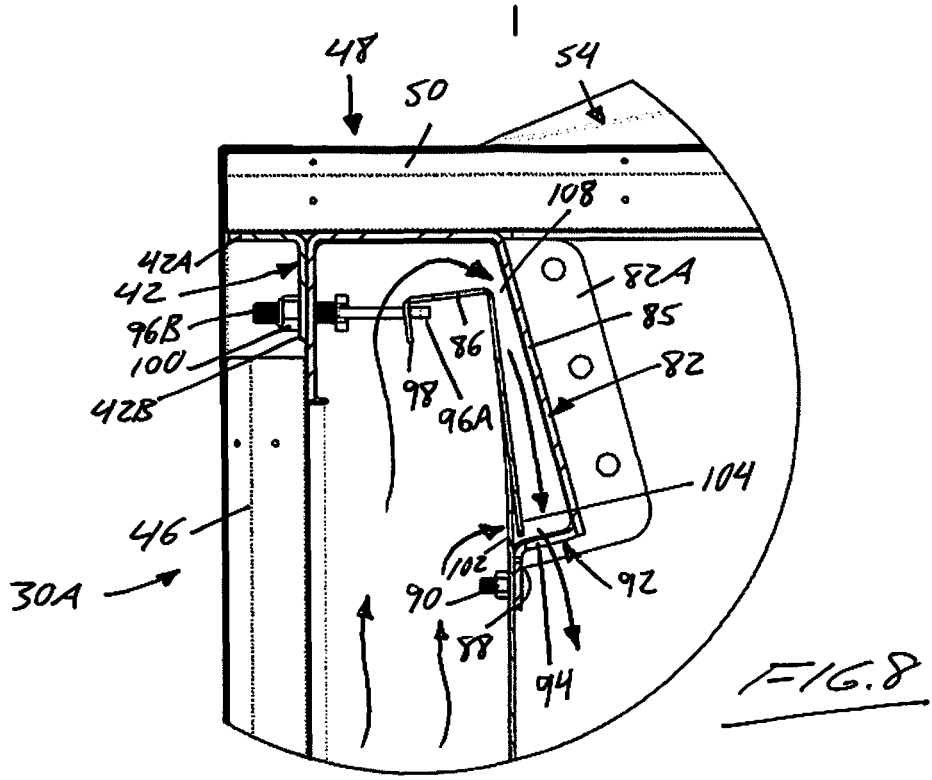
FIG. 8 shows a partial closeup of another transverse cross-section of the biological material dehydrator of FIG. 6, as viewed along line C-C thereof.

With reference to FIG. 8, at least some of the upward flow of heated air within each lateral airspace of the housing is allowed to enter the interior space of the trough 14 itself, where such airflow and heat retained therein further contributes to the dehydration of the biological material in the trough via a combination of heat exchange with, and aeration of, the biological material. To enable such entry of the heated air into the trough 14, air admission openings into the trough interior are provided near the top ends of the trough sidewalls 14B, where such openings will not be obstructed by the biological material occupying the lower regions of the trough. The illustrated embodiment includes a particularly novel design by which air admission openings are not only included, but are also accompanied by a unique damper system by which airflow through these openings can be controlled to achieve optimal drying performance of the dehydrator. It will be appreciated however that other variations of the described air admission openings, and the optional dampering means for controlling airflow therethrough, if included, may alternatively be employed.

In the illustrated example, instead of the upper ends of the trough sidewalls 14B spanning fully to the roof and thereby rendering the top of the trough closed by the roof, the trough sidewalls are each supported in hanging fashion at a spaced distance below the housing roof 48 by one or more elongated support channels 82. In the illustrated embodiment, each sidewall 14B of the trough is supported by two such support channels 82, each spanning from a respective one of the housing's end walls 72A, 72B to a mid wall 84 of that housing 12 that lies parallel to those end walls 72A, 72B at a longitudinal midpoint of the housing that is situated half way therebetween. Each support channel 82 is bolted, welded or otherwise attached to the mid wall 84 and a respective one of the end walls, whereby the support channel 82 is suspended in bridging fashion therebetween. Bent mounting flanges at the ends of the support channels 82 can be seen at 82A in FIGS. 7 and 8 for the purpose of attaching the support channels to the two respective walls of the housing 12. The cross-section of each support channel 82 has an interior arm 85 reaching downwardly into the trough 14 from an elevation above the top end of the respective trough sidewall 14B, which in the illustrated embodiment is an outwardly-bent top end 86 defining an L-shaped flange.

The interior arm 85 is spaced inwardly from the trough sidewall 14B, and at a lower end of the arm 85 that is spaced below the outwardly-bent top end 86 of the trough sidewall 14B, the arm 85 has two bends, one that first turns outwardly toward the sidewall 14B of the trough, and another that then turns downwardly along the sidewall 14B of the trough in abutted contact against the interior surface thereof. The second bend thus forms a connection flange 88 of the support channel 82 at which the support channel is attached to the sidewall 14B of the trough, for example by bolts 90, rivets, welding or other means. The trough is thereby supported in hanging fashion by this connection flange 88 that is situated at an elevationally spaced distance below the outwardly-bent top ends 86 of the trough's sidewalls 14B. Meanwhile the first bend of the support channel's interior arm 85 defines a lower lip 92 of the support channel 82, which juts inwardly from the trough sidewall 14B at the inner surface thereof. This lower lip 92 of each support channel 82 has a series of air admission openings 94 therein at regularly spaced intervals in the longitudinal direction L of the housing. Accordingly, heated air flowing upwardly inside each lateral airspace of the housing can cascade over the outwardly-bent top end 86 of the respective trough sidewall 14B, and flow downwardly through the space between the inner surface of the trough sidewall 14B and the interior arm 84 of the support channel, and then into the trough interior via the air admission openings 94 in the lower lip 92 of the support channel.

Airflow through these air admission openings 92 is adjustable via movement of the upper ends 86 of the trough sidewalls 14B, which in the illustrated embodiment is achieved by way of a series of threaded actuators 96 attached to each trough sidewall 14B at spaced apart locations in the longitudinal direction L of the housing. An inner end 96A of each threaded actuator 96 is attached to a down-turned outer rim 98 of the outwardly-bent top end 86 of the respective trough sidewall 14B. The threaded actuator penetrates through an inner side of the upper longitudinal frame member 42 on the corresponding side of the housing. In the illustrated embodiment, each upper longitudinal member 42 is an angle iron having a top horizontal leg 42A on which the insulated roof panels 50 are seated, and an inner/lower vertical leg 42B depending downward from the top horizontal leg 42A at an inner end thereof nearest the longitudinal midplane P of the housing. The threaded actuator 96 penetrates through an opening in this inner/lower vertical leg 42B so as to place an outer end of the threaded actuator 96 outside the housing's interior space at a location just above the top ends 46A of the housing's insulated wall panels 46. This enables external access to each actuator 96 by an operator of the dehydrator.

In the illustrated example, each threaded actuator 96 has an externally threaded stud that penetrates the upper longitudinal frame member 42 and connects to the down-turned rim 98 of the outwardly-bent top end 86 of the trough sidewall 14B, and an internally threaded nut 100 that is mated with the threaded stud at the outer end of the actuator to serve as a tool-operated driver thereof. Advancement of the nut 100 on the threaded stud pulls outwardly on the downturned rim 98 of the trough sidewall's outwardly-bent top end 86. As shown in FIGS. 1 to 3 of the illustrated embodiment, an additional length of angle iron or right-angle flashing 101 may be installed externally over the upper corners of the housing where the sidewalls 44A, 44B of the housing meet the roof thereof. The flashings 101 thus cover the upper longitudinal members 42, but are provided with access holes 101A through which tool access to the driver nuts 100 of the actuators 96 is enabled.

Referring to FIGS. 8 and 9, at an upper region of each trough sidewall 14B that resides between the outwardly-bent top end 86 of the trough sidewall and the connection flange 88 of the support channel 82, each trough sidewall 14B has a series of U-shaped cutouts 102 therein at regularly spaced intervals in the longitudinal direction L of the housing 12. Each cutout 102 delimits a movable flap 104 that is bordered on three sides thereof by the open space of said cutout, but that remains integrally attached to the remainder of the trough sidewall at fourth top side of the flap 104. The cutouts 102 decrease the overall rigidity of the upper region of each trough sidewall 14B to enable outward flexing thereof under the pulling force exerted by tightening of the threaded actuators 96, and likewise allow returning inward flexing of the sidewall's upper region back into a default position under loosening of the threaded actuator to reduce the pulling force thereof on the trough sidewall. Additionally, under tightening of the threaded actuators 96, the flaps 104 created by the U-shaped cutouts 102 flex inwardly relative to the neighbouring areas 106 of the sidewall's upper region that remain intact between the cutouts, thus increasing the effective size of the cutout space between the flaps 104 and these neighbouring intact areas 106 of the sidewall's upper region. This enables more airflow through the cutouts 102, and onward therefrom through the air admission openings 94 in the lower lip 92 of the support channel. Meanwhile, the outward pulling of the outwardly-bent top ends 86 of the trough sidewalls 14B also increases the size of a gap space 108 between the top end 86 of the trough sidewall 14B and the interior arm 85 of the respective support channel 82 to admit more airflow through this gap space 108.

Accordingly, outward pulling of the top ends 86 of the trough sidewalls 14B by tightening of the threaded actuators 96 increases airflow into the trough interior through the air admission openings 92, and inward relaxation of the top ends of the trough sidewalls back toward their normal default positions reduces the size of both the gap spaces 108 and the effective cutout spaces, thereby reducing the airflow into the trough 14. The movable flaps 104 therefore serve as movable dampers for controlling airflow into the trough 14. Overall airflow of heated air from the biomass furnace or other external heated air source through the dehydrator is thus as follows: admission of heated air into housing 12 through the exterior section 74A of the intake duct 74, and direction of all such heated air into the enclosed under-vessel airspace of the central air distribution channel 76 underneath the trough 14 for longitudinal airflow along the underside of the trough floor in heat exchange relation therewith, laterally outward redirection of the heated air from the central air distribution channel 76 into the lateral airspaces of the housing through the outlet holes 78 in the channel walls; flow of the heated air upwardly through these lateral airspaces in heat exchange relationship with the sidewalls 14B of the trough; admission of this heated air into the trough interior via the air admission openings 92 provided on the trough side walls by the trough-supporting support channels 82; interaction of this trough-admitted heated air with the biological material in the trough in order to both heat and aerate said biological material, and eventual exit of the heated air from the housing via the exhaust outlet 20 installed at the roof of the housing.

FIGS. 10 through 12 show installation of optional loading and unloading equipment on the dehydrator. Particularly useful for the dehydration of animal mortalities in livestock farming operations is the installation of a loading/grinding assembly 110 to the roof of the housing 12. A grinder 112 of the assembly, and an attached grinding motor 114 for driven operation thereof, are installed atop a rectangular perimeter frame of the loading inlet 24 for the purpose of grinding up the carcass of an animal mortality during the loading process. An upright loading chute 116 of the assembly stands vertically upright from the top of the grinder 112, and has an open side 116A that faces toward the second end 28B of the housing 12. A loading tray 118 has a proximal end thereof pivotably hinged to the open side 116A of the chute 116 at the bottom end of the opening therein. The loading tray 118 is thereby pivotable between a generally horizontal receiving position spanning longitudinally outward from the chute 116 toward the second end 28B of the housing 12, as shown in FIG. 10; and a dumping position standing upright in a vertical or nearly vertical orientation in the side opening of the chute 116, as shown in FIG. 12. A powered actuator is included for effecting movement of the loading tray 118 between these two positions, for example in the form of a hydraulic linear actuator 120 having one end pivotally coupled to the roof of the housing and the other end pivotally coupled to an underside of the loading tray 118. The illustrated embodiment includes a support stanchion 122 standing upright from the roof of the housing at or near the second end 28B thereof. The top end of the stanchion 122 features a support cradle 124 positioned to receive and support the underside of the loading tray 118 in the receiving position thereof. In the illustrated example, the loading tray has a shorter sidewall 118A on a loading side thereof opposite the offset exhaust duct 52, and a taller sidewall 118B on a non-loading side thereof adjacent the offset exhaust duct 52. The animal mortalities are loaded onto the loading tray 118 over the less obstructive shorter sidewall 118A on the loading side. As shown, the distal end of the loading tray 118 may be an open end lacking any upstanding end wall from the floor of the tray.

The offset position of the exhaust duct 52 accommodates such optional inclusion of a loading tray 118 atop the roof of the housing so that the tray fits within the footprint of the housing in both the receiving and dumping positions, instead of requiring placement of the loading tray in an alternative position that would avoid a centrally located exhaust duct but would increase the overall footprint of the dehydrator. To load an animal mortality into the dehydrator, the loading tray 118 originally starts in the receiving position of FIG. 10 to accept placement of one or more animal mortalities atop the loading tray. With the grinder 112 running, the actuator 120 is extended to lift the loading tray 118 up toward the dumping position, during which the one or more animal mortalities slide into the loading chute 116 through the open side 116A thereof, and are gravitationally urged downwardly through the running grinder. The grinder 112 breaks down the animal carcass as it descends through the loading inlet 24 into the trough 14 of the dehydrator. During this loading and grinding operation, the agitator motor 64 is also run in the appropriate direction causing the agitator tines 62 to advance the incoming ground carcass material along the trough toward the second end of the housing, thus distributing the material along the length of the trough. If multiple animal mortalities exceeding the loading tray's capacity require disposal, this loading operation can be repeated multiple times up to the available trough capacity of the dehydrator, for example until the trough is filled up to approximately the level of the agitator shaft 58. Though the loading tray is particularly useful for loading and grinding of animal mortalities in a livestock farming scenario, it can also be used for loading of other types of biological material into the dehydrator, whether straight into the housing thereof, or via the optional grinder 112, depending on the nature and condition of the biological material.

FIGS. 10 through 12 also illustrate installation of an unloading conveyor for conveying the dehydrated material from the dehydrator to another location. In the illustrated embodiment, the unloading conveyor is a U-through unloading auger 126 having an input end thereof coupled to the unloading outlet 26 of the housing 12, and sloping upwardly therefrom at an inclined angle to an output end of the auger 126 (not shown) that resides at an elevated location for feeding into a storage container or other depository for the dehydrated material. In some instances, including the livestock mortality applications mentioned above, the dehydrated material output from the dehydrator can be used as a biomass fuel, and therefore can be subsequently fed into the same biomass furnace optionally used as the heated air source for the dehydrator. In such livestock farming applications, such farms will typically also have plant waste that can be used as another biomass fuel supply for the biomass furnace, whereby the entire dehydration operation may be run with zero or minimal use of fossil fuels. The dehydrated biomass from the dehydrator is fed from the depository into the biomass furnace, thus forming a closed loop fuel supply that supplements the plant-based biomass fuel supply from the farming operation.

In other embodiments, instead of a loading tray 118, biological material may be fed into the dehydrator by a loading conveyor, for example a belt conveyor or auger, whether feeding directly into the loading inlet 24, into a grinder 112, or into a feed hopper installed over the loading inlet or grinder. For example, sewage sludge from a waste-water treatment site may be fed into a larger scale version of the dehydrator by such a loading conveyor, and then dehydrated within the dehydrator. The final dehydrated biological material is unloaded from the dehydrator through the unloading outlet 26, and can then conveyed to a container or other depository by an unloading conveyor 126. The resulting dehydrated product, having been suitably heated for a long enough period in dehydration cycle to kill all pathogens from the source sludge, can then be buried, spread in a field or otherwise disposed of, or used as a soil additive or for other final purpose.

A typical dehydration cycle may involve one or more repetitions of a mixing sequence that comprises, in sequential order:

1) an active agitation/advancement period characterized by driven operation of the agitator 16 in an advancing direction operable to both stir the biological material in the trough and cause conveyance thereof in a forward axial direction toward an output end of the trough that is adjacent the second end 28B of the housing 12;
2) a first passive resting period characterized by static inaction of the agitator;
3) an active agitation/reversal period characterized by driven operation of the agitator 16 in a reversing direction operable to both stir the biological material in the trough and cause conveyance thereof in a rearward axial direction back toward an inlet end of the trough that is adjacent the first end 28B of the housing 12; and
4) a second passive resting period again characterized by static inaction of the agitator.

In other words, the mixing sequence comprises two active agitation periods that are characterized by driven operation of the agitator in opposing directions, with intervening passive resting periods, whereby the biological material is periodically agitated in the active periods, but left sitting static in the trough during the intervening rest periods so that the heated air can heat and aerate the periodically agitated material, thereby drying the material and killing pathogens therein. While the forging sequence has the agitation/advancement period as the first of the two active agitation periods, the order thereof may be reversed.

The dehydrator can be operated in batch or continuous fashion. In batch operation, biological material is introduced to the dehydrator in a desired batch volume that does not exceed the capacity volume of the trough. The dehydration cycle then comprises execution of a plurality of the aforementioned mixing sequences, until a user-specified cycle time has lapsed. The overall cycle time can be selected according to the particular biological material, the volume thereof in the dehydrator, and desired characteristics of the final dehydrated product derived from the dehydration process. For example, smaller scale dehydrators for processing livestock mortalities may use a cycle time in the order of 12-36 hours, whereas larger scale dehydrators for sewage sludge may use a longer cycle time in the order of 2 to 4 days. On completion of the dehydration cycle, a full-unloading step is then executed, during which the agitator is operated in the advancing direction long enough to force all of the biological material from the trough through the unloading outlet 26, while the unloading conveyor 126 is simultaneously run in order to carry the full trough worth's of dehydrated material from the dehydrator to the destination container or other depository. The destination container or depository may be a stationary one for on-site storage, or a holding container of a transport vehicle for transporting the final dehydrated product to a remote off-site location.

In continuous operation, the dehydrator is loaded with source biological material in a volume limited only by the available trough capacity, and a first dehydration cycle is executed in the same fashion described for batch operation. At the end of the first dehydration cycle, rather than performing a full-unloading step like that described for batch operation, a partial-unloading step is instead executed. Here, operation of the agitator 16 in the advancing direction, and simultaneous operation of the unloading conveyor 126, is performed only long enough to some, and not all, of the previously loaded biological material from the dehydrator through the unloading outlet 126. Instead of emptying the entire trough, this only opens up some available space at the inlet end of the trough. During this partial-unloading step, more biological material may be added to the trough through the loading inlet, e.g. by powered operation of a loading conveyor in simultaneous fashion with the advancingly operated agitator.

From hereon, the continuous operation of the dehydrator then involves execution of a modified mixing cycle, either on a continuously repeated basis, or in regularly or periodically alternating fashion with the standard mixing cycle described above for batch operation. The modified mixing cycle, like the standard mixing cycle, involves the same alternating repetition of active advancing and retracting agitator periods with intervening passive rest periods, but differs in that the agitation/advancement period is an extended agitation/advancement period of greater time duration than the agitation/reversal period, and in that the unloading conveyor 126 is operated during each extended agitation/advancement period, as is the loading conveyor that feeds into the loading inlet 24, if such a loading conveyor is included in the given dehydrator installation. Accordingly, with each execution the modified mixing sequence, the material already in the trough is pushed further in the forward direction than it is pulled back in the rearward direction. During each extended agitation/advancement period of the modified mixing cycle, a fully-dehydrated volume of the biological material at the outlet end of the trough 14 is pushed through the unloading outlet 26 into the unloading conveyor 126, while newly available trough space is opened up at the inlet end of the trough 14 to accommodate introduction of fresh new biological source material through the loading inlet 24. The dehydrator can thus be operated on a continual basis, where fresh biological source material is introduced at the loading inlet 24 any time that fully dehydrated biological material is being discharged through the unloading outlet 26 as part of the extended agitation/advancement step of the modified mixing sequence. As mentioned above, in continuous operation, each of the second and subsequent mixing cycles may be of the modified type with the extended agitation/advancement period causing discharging of material through the unloading output, or the second and subsequent mixing cycles may comprise a combination standard mixing cycles regularly or periodically intervened by a modified mixing cycle.

A programmable logic controller (PLC) or other programmable controller is preferably connected to one or more powered components of the dehydrator installation, including at least the agitator motor 64, and preferably also including a drive motor of the unloading conveyor 126, and a drive motor of the loading conveyor (if included), or optionally the actuator 120 of the lifting tray 118 (if included). The controller can therefore be used to at least partially automate batch or continuous operation of the dehydrator, particularly to control operation of at least the agitator motor 64, and preferably also the drive motor of the unloading conveyor 126, and the drive motor of the loading conveyor (if included), or optionally the actuator 120 of the lifting tray 118 (if included). A human operator may program the controller to set different operational parameters of the dehydrator, including any one or more of the following: agitator run time for the active agitation/advancement period; agitator run time for the extended active agitation/advancement period; agitator run time for the active agitation/reversal period; rest time duration for the passive resting periods between the active agitation periods; quantity of mixing cycles to perform; frequency of modified mixing cycles (e.g. run modified mixing sequence every N number of mixing cycles, where N=0 denotes no modified mixing cycles for batch operation; N=1 denotes running of only mixed modified cycles during continuous operation; N=2, 3, 4, etc. denotes running a modified mixing cycle every second, third, fourth mixing cycle, etc. during continuous operation); and a final agitator run time for the full-unloading step after the completed dehydration cycle.

So for example, if a user sets a 5 minute agitator run time for both of the active agitation periods, a 25 minute rest time duration, a zero frequency for modified mixing cycles, a mixing cycle quantity of 24, and a final agitator run time of 30 minutes, this will be effective to perform a batch operation with a 24 hour dehydration cycle:

$$\text{Mixing cycle time} = 5 \text{ minute agitation/advancement} + 25 \text{ minute rest} + 5 \text{ minute agitation/reversal} + 25 \text{ minute rest} = 1 \text{ hour}$$

$$\text{Mixing cycle quantity} = 24$$

$$\text{Dehydration cycle time} = \text{Mixing cycle quantity} \times \text{mixing cycle time} = 24 \times 1 \text{ hr} = 24 \text{ hrs}$$

The programmable controller therefore gives the operator full and total control over the type of operation to run (batch vs. continuous), timing of the mixing cycles, quantity of mixing cycles, timing of periodic material discharge from the dehydrator in continuous operation (and the optionally accompanying automated introduction of fresh material at the loading inlet during each such periodic discharge), and the resulting overall dehydration cycle time dictated by the other timing and frequency values.

While the illustrated embodiment has the exhaust duct laterally offset to one side of the housing to accommodate optional installation of a loading tray that spans a substantial length of the housing in the receiving position, such offset placement of the exhaust duct could be omitted in instances where no loading tray installation is intended, or where the loading tray length relative to the housing length is such that the loading tray can fit entirely between the loading chute 116 and the exhaust outlet 20 in the receiving position of the loading tray. Also, while the illustrated embodiment adopts a parallel-flow configuration, where the overall travel-through direction in which biological material moves longitudinally through the dehydrator from the loading inlet to the unloading outlet matches the airflow direction in which the heated air flows through the dehydrator from the air intake 18 to the exhaust outlet 20, the dehydrator could be reconfigured with a counter-flow configuration in which the material travel-through direction opposes the airflow direction. In the illustrated embodiment, the parallel-flow configuration elegantly accommodates operational roof-based placement of the both the loading inlet 24 and the exhaust outlet 20 in non-interfering relationship to one another.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A dehydrator apparatus for dehydrating biological material, said apparatus comprising:
   an external housing;
   a vessel supported within said external housing and spanning in a longitudinal direction thereof in a position placing a bottom of said vessel in elevated relation from a bottom of said housing;
   a loading inlet feeding into said vessel from outside the external housing for admission of biological material to be dehydrated or composted within the apparatus;
   an air intake feeding into the external housing to deliver heated air thereto from a hot air source;
   air routing components residing within the external housing and configured to guide said heated air into heat exchange relationship with said vessel and into heating and aerating exposure to contents of said vessel;
   an agitator installed in operable relation to the vessel to agitate the material fed thereinto via the material inlet; and
   an exhaust outlet for exhausting said heated air from the external housing after having heated and aerated said vessel and said contents thereof.

2. The dehydrator apparatus of claim 1 wherein said vessel is an elongated vessel of greater length in a longitudinal direction of said housing than width in a transverse direction of said housing.

3. The dehydrator apparatus of claim 1 wherein said vessel is an elongated trough.

4. The dehydrator apparatus of claim 1 wherein said vessel is supported in elevated fashion leaving open an under-vessel airspace therebeneath into which said heated air is directed to warm a floor of said vessel from said under-vessel airspace.

5. The dehydrator apparatus of claim 4 wherein said air routing components comprise an air distribution channel that runs along an underside of the floor of said vessel and delimits said under-vessel air space.

6. The dehydrator apparatus of claim 5 wherein the air intake comprises an intake duct feeding into said air distribution channel adjacent an end thereof.

7. The dehydrator apparatus of claim 5 wherein sidewalls of said air distribution channel have respective series of outlet holes therein at spaced positions along said air distribution channel through which the heated air escapes said under-vessel air space in lateral directions outwardly to either side of said vessel.

8. The dehydrator apparatus of claim 1 wherein the air routing components comprise, at elevated positions on said vessel, air admission openings that open into an interior of the vessel to admit at least some of said heated air into the interior of the vessel.

9. The dehydrator apparatus of claim 1 wherein the vessel is an open-top vessel of which a top end is spaced below a roof of the housing to allow heated air to cascade into said vessel from the top end thereof.

10. The dehydrator apparatus of claim 1 wherein said vessel comprises sidewalls, and the air routing components comprise cutouts in said sidewalls of the vessel that delimit respective movable flaps that are integrally connected with said sidewalls of the vessel at ends of said flaps, and said movable flaps serve as air control dampers that are adjustable in position to control airflow into the interior of the vessel through said cutouts.

11. The dehydrator apparatus of claim 1 comprising air control dampers operable to control airflow into the vessel.

12. The dehydrator apparatus of claim 10 wherein said air control dampers are equipped with actuators that are operable to control positions of said dampers, and that are accessible from an exterior of the external housing.

13. The dehydrator apparatus of claim 12 wherein said air control actuator comprises screw-based actuators having rotatable drivers situated externally of the external housing.

14. The dehydrator apparatus of claim 12 wherein said actuators are connected to sidewalls of the vessel proximate top ends thereof and are operable to flex upper regions of said sidewalls of the vessel outwardly to admit more of said heated air into the vessel.

15. The dehydrator apparatus of claim 1 wherein the loading inlet resides at a roof of the external housing for admission of biological material from above a top opening of the vessel.

16. The dehydrator apparatus of claim 1 comprising a grinder operably installed in relation to the loading inlet to grind the biological material as it enters the housing.

17. The dehydrator apparatus of claim 1 comprising an unloading outlet that opens through an end wall of the housing at an output end of the vessel for discharge of the dehydrated biological material therethrough.

18. The dehydrator apparatus of claim 1 comprising an unloading outlet through which the dehydrated biological material is discharged from the housing, and an unloading conveyor coupled to said unloading outlet to convey the material from the external housing to a container or depository.

19. The dehydrator apparatus of claim 1 wherein the exhaust outlet and the air intake reside at or adjacent opposing ends of the housing.

20. The dehydrator apparatus of claim 1 wherein the air intake opens into the housing through an end wall thereof.

21. The dehydrator apparatus of claim 1 wherein said agitator is operable to both mix the contents of the vessel and axially displace said contents along the vessel.

22. The dehydrator apparatus of claim 21 wherein said agitator is operable in both an advancement mode that moves the contents of the vessel in a forward direction therealong toward an outlet end thereof, and a reversal mode that moves the contents of the vessel in an opposite rearward direction therealong away from said outlet end.

23. The dehydrator apparatus of claim 22 comprising a controller operably connected to a drive system of said agitator, and configured to drive a mixing sequence of the agitator that comprises alternatingly driving said agitator in the advancement and reversal modes.

24. The dehydrator apparatus of claim 23 wherein said controller is configured to place and maintain said agitator in a static resting state between sequential operations in the advancement and reversal modes for heating and aeration of the contents of the vessel while resting statically therein between said sequential operations.

25. The dehydrator apparatus of claim 23 wherein the controller is configured such that, in execution of a given dehydration cycle that comprises multiple repetitions of said mixing cycle, some or all of said repetitions of the mixing cycle are characterized by a longer run time in the advancement mode than in the reversal mode.

26. The dehydrator apparatus of claim 1 wherein the air intake comprises an offset intake duct residing in offset relation from a midplane of the vessel to accommodate drive componentry of the agitator that resides adjacent to said offset intake duct at a respective end of the housing.

27. The dehydrator apparatus of claim 1 comprising a loading tray installed in cooperating relation to the loading inlet to aid in loading of the biological material into the housing, said loading tray being movable between a receiving position for receiving said biological material atop said loading tray, and a dumping position for dumping said biological material from the loading tray through the loading inlet.

28. The dehydrator apparatus of claim 27 wherein the loading tray resides entirely within a footprint of the housing in both the receiving and dumping positions.

29. The dehydrator apparatus of claim 1 in combination with said hot air source, wherein said hot air source is a furnace having a hot air outlet connected to the air intake of the dehydrating apparatus.

30. A method of operating the dehydrating apparatus of claim 29 comprising introducing biological material to the dehydrating apparatus, dehydrating said biological material therein using hot air from the furnace, collecting said dehydrated material from the dehydrating apparatus, and feeding at least some of said collected material into the furnace for use therein as a combustion fuel.

31. The method of claim 30 wherein said biological material comprises one or more livestock mortalities.

32. The method of claim 31 wherein, at least during dehydration of the biological material, said furnace is at least partially fueled by plant-based biomass fuel.

33. The method of claim 32 wherein said plant-based biomass fuel is sourced from a same farming operation as said one or more livestock mortalities.

34. A method of operating the dehydrating apparatus of claim 1 comprising loading sewage sludge into the vessel of the dehydration apparatus for dehydration of said sewage sludge therein.

* * * * *